United States Patent [19]

Le Doux et al.

[11] Patent Number: 4,857,258

[45] Date of Patent: Aug. 15, 1989

[54] PROCESS FOR THE MANUFACTURING OF A MULTILAYER PLASTIC CONTAINER

[76] Inventors: Georges F. J. Le Doux, St. Bernardusstraat 14, 6211 HL Maastricht; Johannes H. Geesink, Holsterbeek 5, 6166 JS Geleen, both of Netherlands

[21] Appl. No.: 834,358

[22] Filed: Feb. 28, 1986

[30] Foreign Application Priority Data

Feb. 1, 1986 [NL] Netherlands ............ 8600251

[51] Int. Cl.⁴ .......................................... B29C 49/22
[52] U.S. Cl. ..................................... 264/515; 264/516; 264/572; 264/526
[58] Field of Search ............ 264/515, 516, 526, 571, 264/511, 572

[56] References Cited

U.S. PATENT DOCUMENTS

| | | | |
|---|---|---|---|
| 3,023,461 | 3/1962 | Sherman | 264/515 |
| 3,082,484 | 3/1963 | Sherman | 264/515 |
| 3,113,831 | 12/1963 | Coale | 264/512 |
| 3,275,726 | 9/1966 | Rudolph | 264/529 |
| 4,015,033 | 3/1977 | Nield | 428/35 |

FOREIGN PATENT DOCUMENTS

| | | |
|---|---|---|
| 1505492 | 11/1967 | France . |
| 2119200 | 7/1972 | France . |
| 46-29994 | 8/1971 | Japan ............ 264/515 |
| 58-22141 | 2/1983 | Japan ............ 264/515 |
| 1227083 | 3/1971 | United Kingdom . |

OTHER PUBLICATIONS

European Search Report EP 87200142 dtd May 22, 1987.
Translation of French Patent 2,119,200 Pub., Aug. 4, 1972.

Primary Examiner—Jan H. Silbaugh
Assistant Examiner—Neil Michael McCarthy
Attorney, Agent, or Firm—Cushman, Darby & Cushman

[57] ABSTRACT

A process for the preparation of a multilayer plastic container in which an inner and an outer layer, one of which is in the melt phase, are introduced into an opened mold. Before the mold is closed, the inner layer is inflated by a pressurized medium until the facing surfaces of the inner and outer layers are in contact over almost all their respective surface areas. The mold is then closed and the first and second layers are forced against the mold wall by a pressurized medium.

5 Claims, 4 Drawing Sheets

PROCESS FOR THE MANUFACTURING OF A MULTILAYER PLASTIC CONTAINER

BACKGROUND OF THE INVENTION

The invention relates to a process for the preparation of a multilayer plastic container in which an inner and an outer layer, one of which is in the melt phase, are introduced into an opened mold and are after closing of the mold, forced against the mould wall by a pressurized medium.

Such a process is known from Japanese patent publication No. 45-39189. In the known process the inner and the outer layer are introduced into an opened mold, upon which the mould is closed and first the inner layer is forced against the outer layer by means of a pressurized medium and subsequently the layers are together forced against the interior mold wall.

In non-shaped condition the outer layer need not fully enclose the inner layer, as is the case, for instance, when a cylindrical inner layer, for instance a rounded film or a film extruded in that shape, and two flat or curved films are placed in the open mold opposite each other and on either side of the inner layer.

In the known process it is quite possible for the air between the layer to be trapped at least in part between the compressed layers, which in a number of applications of products obtained by the process is a serious technical disadvantage.

The object of the invention is to provide a process in which said disadvantage does not occur, or at least not to an obstructive degree.

SUMMARY OF THE INVENTION

The process according to the invention is characterized in that the layers are contacted with each other over almost the entire area of their facing surfaces and are sealed together prior to the mold being closed. As the layers ar first sealed together in the process according to the invention and are only then formed further in the closed mold, local folds, air inclusions and/or qualitatively poor seals are prevented.

The process according to the invention can be applied in the preparation of containers having a wall consisting of two or more layers. These layers may all be of different plastics, but there is no need for this. Each of the layers placed in the opened mold, may also consist of various layers of different materials.

An embodiment of the process according to the invention is characterized in that the layers, before being contacted, are compressed near an extreme edge thereof, and subsequently the inner layer is forced against the outer layer by means of a pressurized medium. In this manner, the layers begin to seal together from the edge where they were compressed, so that the air is effectively expelled starting on one side.

Another embodiment of the process according to the invention is characterized in that at least one of the layers is introduced into the opened mold in the form of an extruded tube in the melt phase. This has the advantage that the heat required for sealing is derived from this layer in the melt phase, so that no external heat need be supplied.

Yet another embodiment of the process according to the invention is characterized in that at least one of the layers is introduced into the opened mold in the form of multilayer film. This has the advantage that the choice of materials of which the multilayer film may consist yields great flexibility as regards properties of the product obtained.

Another embodiment of the process according to the invention is characterized in that the inner layer is introduced into the opened mold in the form of a balloon-shaped film and the volume of the balloon is reduced before the outer layer is introduced into the mold. The advantage of this embodiment of the process according to the invention is that on the inner side of the container a layer can be provided that has certain properties as required for a specific application.

The latter two embodiments are advantageous, especially when the final product is to satisfy demands as regards the permeability of gases or vapours and/or the mechanical properties. In view of this, these embodiments are particularly suitable for the manufacture of containers for storing chemical substances, such as solvents, and also for the manufacture of technical products, such as petrol tanks.

In principle all polymer plastics can be used in the process according to the invention, optionally use being made of a tackifier to obtain a proper seal.

Particularly suitable plastics are, for instance, for one layer HDPE or LLDPE, in combination with an other layer consisting of a multilayer film built up of: HDPE-Plexar-Nylon 6-Plexar-HDPE, or of: HDPE-Surlyn-Polyester-Surlyn-HDPE. In the multilayer film use may also be made of LLDPE instead of HDPE, while Polyester may be replaced by: Eval, Nylon-Eval blends, Nylon 6.12 and copolymer of said substances.

The process according to the invention will subsequently be elucidated on the basis of a number of figures, of course without being restricted thereto.

DETAILED DESCRIPTION OF PREFERRED EMBODIMENTS

Figure 1:
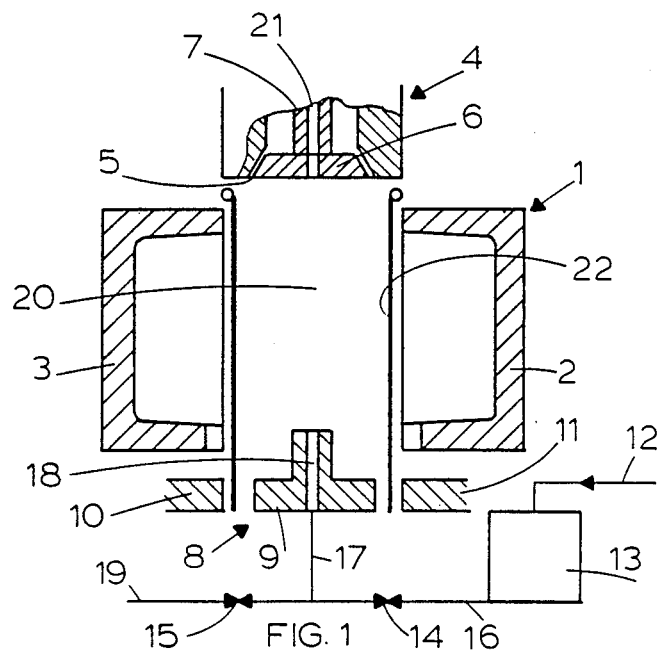
FIGS. 1 through 4 represent a number of process steps of an embodiment of the invention, the inner layer being an extruded parison and the outer one consisting of two flat films or one tubular film.
Figure 2:
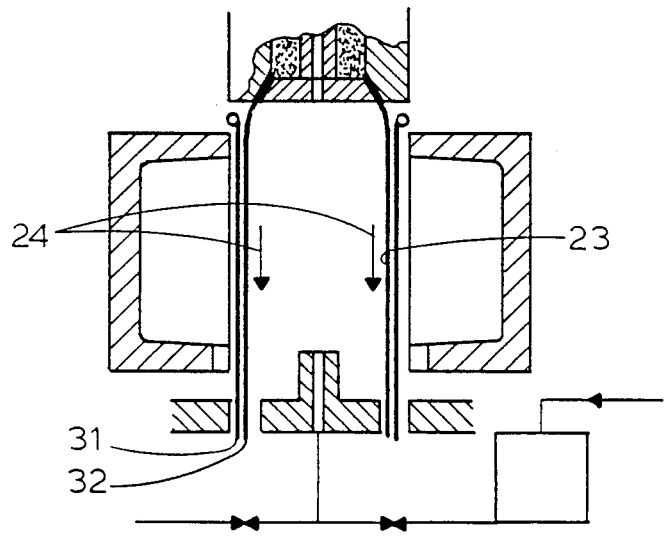
Figure 3:
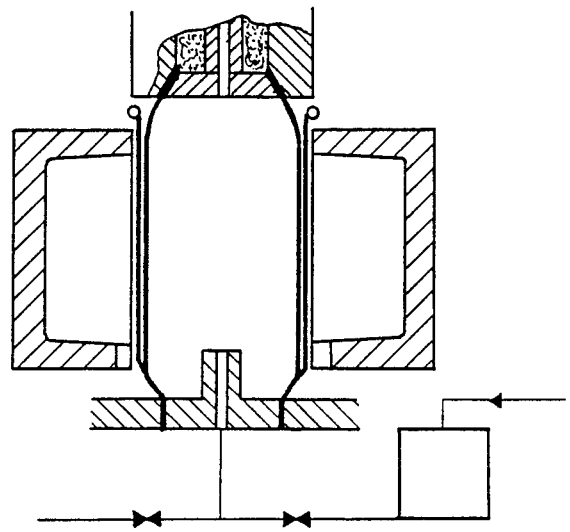
Figure 4:
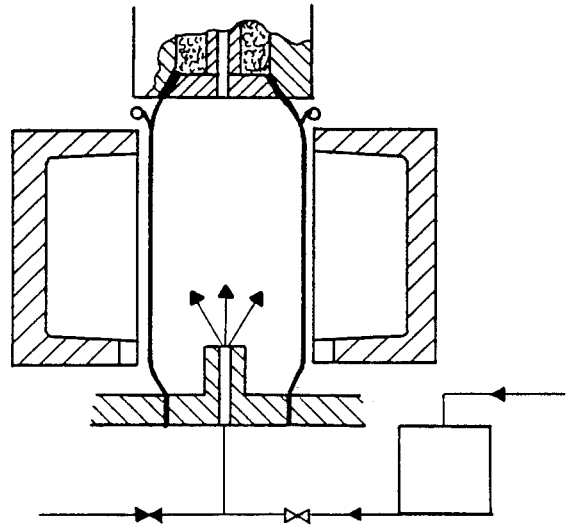
Figure 5:
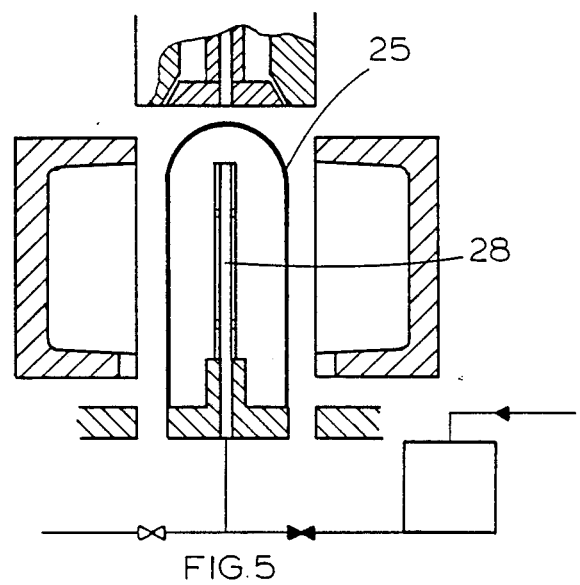
FIGS. 5 through 8 represent a number of process steps of an embodiment of the process according to the invention in which the inner layer consists of a balloon-shaped, multilayer tubular film and the outer layer of a single-layer parison. As a rule, in the drawings the reference numerals of similar parts are mentioned only once. The numerals in the drawings alway have the same meaning.
Figure 6:
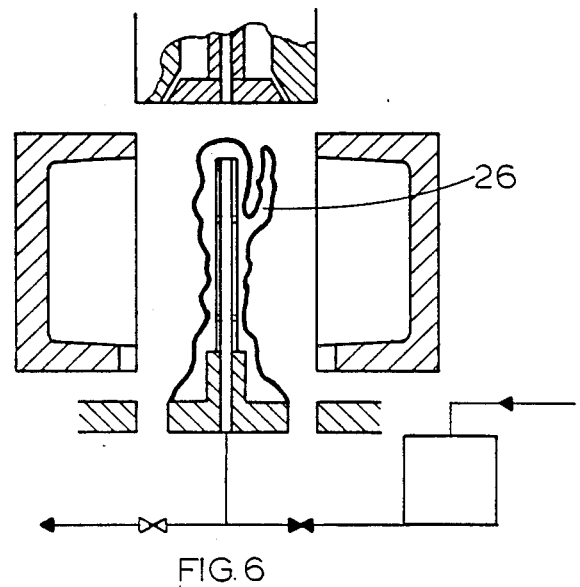
Figure 7:
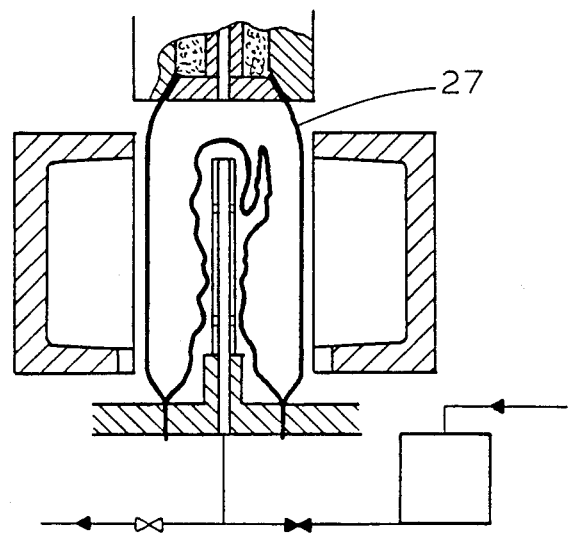
Figure 8:
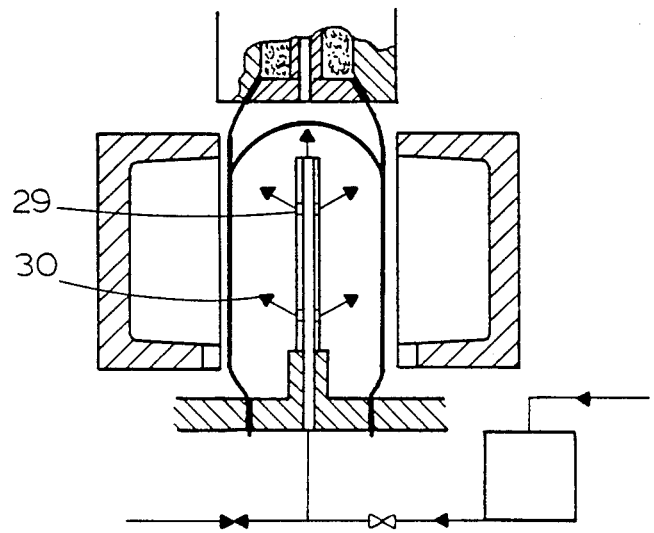

In FIG. 1, 1 is a mold comprising two mold halves 2 and 3. Numeral 4 is an extrusion die, of which 5 is the extrusion gap and 6 a mandrel controlled by means of spindle 7.

A device 8 comprises a fixed central part 9 and two movable parts 10 and 11. Through line 12, a pressurized medium, for instance air, is supplied to buffer vessel 13.

When valve 14 is opened, and valve 15 closed, this medium can be supplied, through lines 16 and 17, to an opening 18 in the central part 9 of clamping device 8.

When valve 14 is closed and valve 15 opened, medium present in cavity 20 can be discharged through lines 17 and 19, and opening 18, and, optionally, an under-pressure relative to the atmosphere can be created.

Through opening 21 in spindle 8, which extends into mandrel 6, pressurized medium can also be supplied or a medium can be discharged from cavity 20.

FIGS. 2 through 8 represent the same device as FIG. 1, except for support tube 28, which is provided with openings 29 (see FIGS. 5 through 8).

The embodiment of the process according to the invention of which a number of process steps are represented in FIGS. 1 through 4 is substantially carried out as follows:

First, outer layer 22 (see FIG. 1) is introduced into opened mold 1. Subsequently, extruder 4 introduces, in the direction of arrows 24, inner layer 23, in the form of a parison, into the opened mold (see FIG. 2). After this, inner layer 22 and outer layer 23 are compressed near their bottom edges 31 and 32 by clamping device 8 (see FIG. 3) and valve 14 is opened for such a period of time (see FIG. 4) that the pressurized medium, for instance compressed air, blows up the parison until the inner and the outer layer contact each other over virtually the entire area of their facing surfaces. Finally, mould halves 2 and 3 are moved towards each other, the mould is closed (not shown), and both layers are together forced against the inner wall of the mold by the pressurized medium. After cooling, the mold can be opened and the object removed from it.

The embodiment of the process according to the invention of which a number of process steps are represented in FIGS. 5 through 8 is substantially carried out as follows:

First, a balloon-shaped multilayer film 25 (see FIG. 5) is introduced into opened mold 1 and supported by central part 9 of clamping device 8. Subsequently, valve 15 is opened—valve 14 is closed—and the balloon volume is reduced by sucking off, through lines 17 and 19, of the medium in the balloon (usually air). 28 is a support tube for lateral support of the shurnken balloon 26 (see FIG. 6). Next, extruder 4 introduces a parison, shown in FIG. 7 by 27, into the opened mold, the bottom edge (not shown) of which is forced against the bottom edge (not shown) of balloon shaped film 25 by device 8 (see FIG. 7). After this, valve 15 is closed and valve 14 opened, so that the pressurized medium flows from buffer vessel 13 into the cavity of the balloon-shaped film (see FIG. 8).

When the shrunken balloon-shaped film 26 has been blown up to such an extent that it contacts outer layer 27 almost everywhere and both layers together are nicely tight, mold halves 2 and 3 are moved towards each other, mold 1 is closed and both layers are together forced against the inner wall of the mold, use being made of the pressurized medium.

The air between the inner layer and the outer layer can be discharged through opening 21.

It must be possible for the air between the mold halves and the two layer to escape in a way known to one skilled in the art. After cooling, the mold can be opened and the object removed.

We claim:

1. A process for the preparation of a multilayer plastic container, comprising the steps of:
   (a) introducing a first multi-ply plastic layer between sections of an opened container mold;
   (b) thereafter introducing a second inflatable layer between said sections of the opened container mold, wherein said second layer is surrounded by said first layer, whereby a first inner surface of the first layer faces a second outer surface of the second layer, and wherein said second, inflatable layer is in the melt phase and is introduced by extrusion from a first point above said mold;
   (c) after step (b), mechanically clamping the first and second layers together at a second point below said mold;
   (d) after step (c), inflating said second layer until said first and second layers are in contact over substantially all of said first and second surfaces;
   (e) after step (d), closing the sections of the mold around said first and second layers; and
   (f) after step (e), further inflating the second layer to force the first and second layers against the mold, whereby a multilayer plastic container is prepared.

2. A process according to claim 1, wherein said step of inflating further comprises evacuating a space between said first and second surfaces.

3. A process according to claim 1, wherein step (d) further comprises sealing said first and second layers.

4. A process for the preparation of a multilayer plastic container, comprising the steps of:
   (a) introducing a deflated balloon of a first inflatable, multiply plastic film layer between sections of an opened container mold;
   (b) introducing, by extrusion from a first point above said mold, a second, melt phase layer between said sections of the opened container mold and surrounding said first layer, whereby a first outer surface of the first film faces a second inner surface of the second layer;
   (c) after step (b), mechanically clamping the first and second layers together at a second point below said mold;
   (d) after step (c), inflating said first layer until said first and second surfaces are in contact over substantially all of said first and second surfaces;
   (e) after step (d), closing the sections of the mold around said first and second layers; and,
   (f) after step (e), further inflating the first layer to force the first and second layers against the mold, whereby a multilayer plastic container is prepared.

5. A process according to claim 4, wherein step (a) further comprises providing means within the interior of the deflated balloon for at least partially supporting the same prior to inflation thereof.

* * * * *

UNITED STATES PATENT AND TRADEMARK OFFICE
CERTIFICATE OF CORRECTION

PATENT NO. : 4,857,258
DATED : August 15, 1989
INVENTOR(S) : Le Doux et al.

It is certified that error appears in the above-identified patent and that said Letters Patent is hereby corrected as shown below:

Col. 1, line 10, change "mould" to --mold--;

line 15, change "mould" to --mold--;

line 39, change "ar" to --are--; and line 55, change "were" to --are--.

Col. 2, line 48, change "alway" to --always--.

Col. 3, line 21, change "mould" to --mold--;

line 23, change "mould" to --mold--;

line 37, change "shurnken" to --shrunken--;

line 56, change "layer" to --layers--.

Signed and Sealed this

Twelfth Day of February, 1991

Attest:

HARRY F. MANBECK, JR.

*Attesting Officer*      *Commissioner of Patents and Trademarks*